May 10, 1932.  L. G. AMES  1,858,029
BEVERAGE DISPENSER
Filed March 21, 1930  3 Sheets-Sheet 1
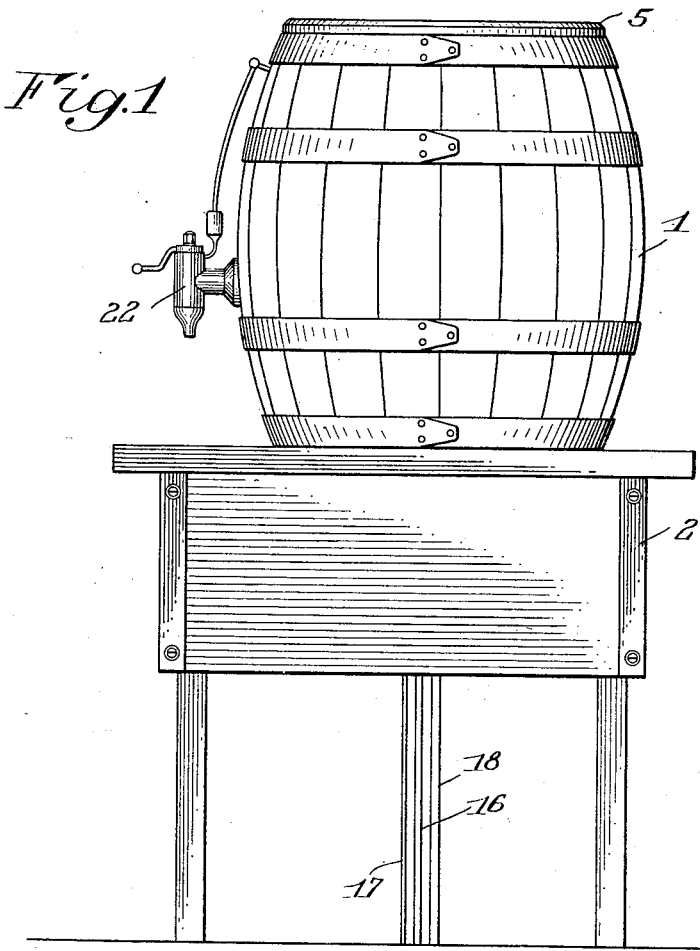
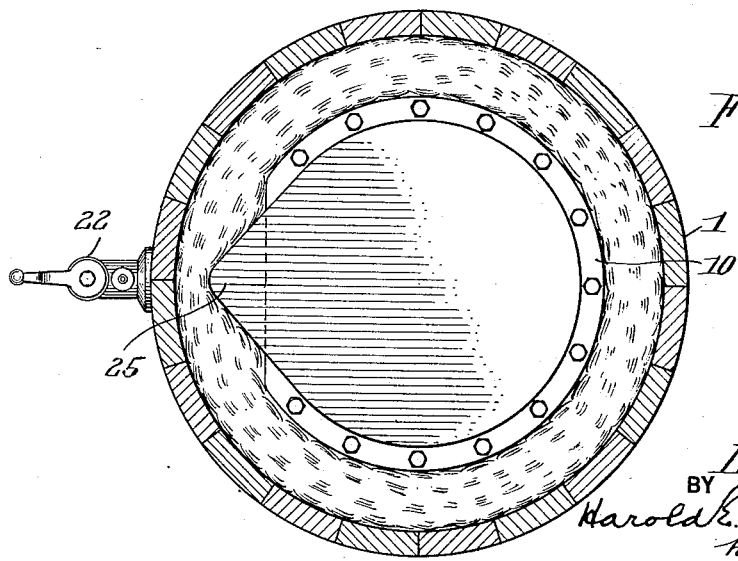
INVENTOR
Lewis G. Ames
BY Harold E. Stonebraker
his ATTORNEY

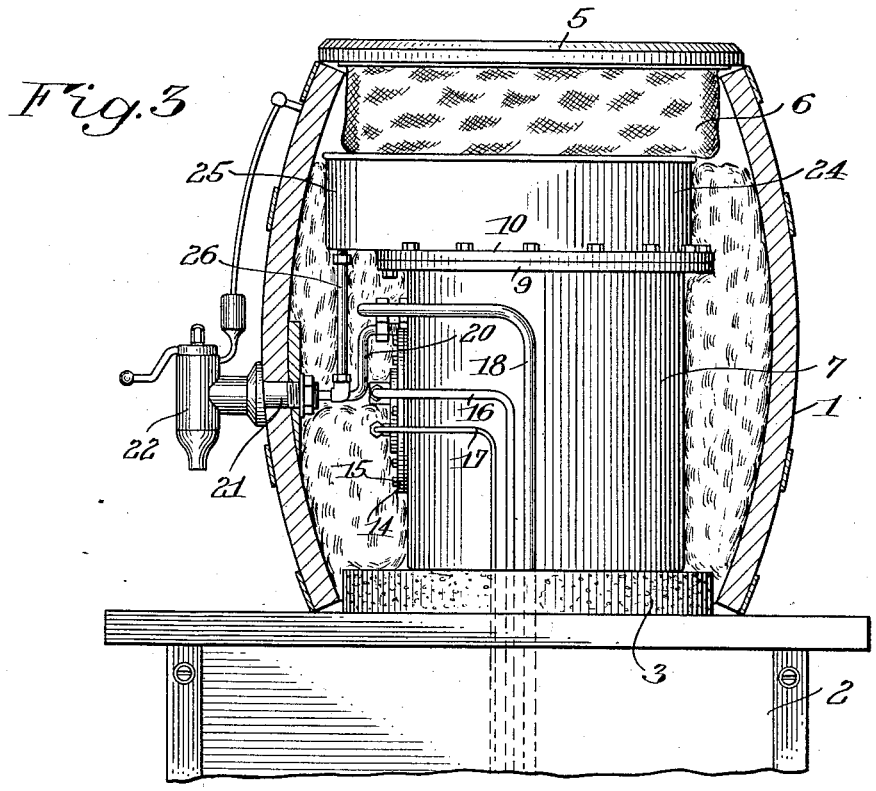
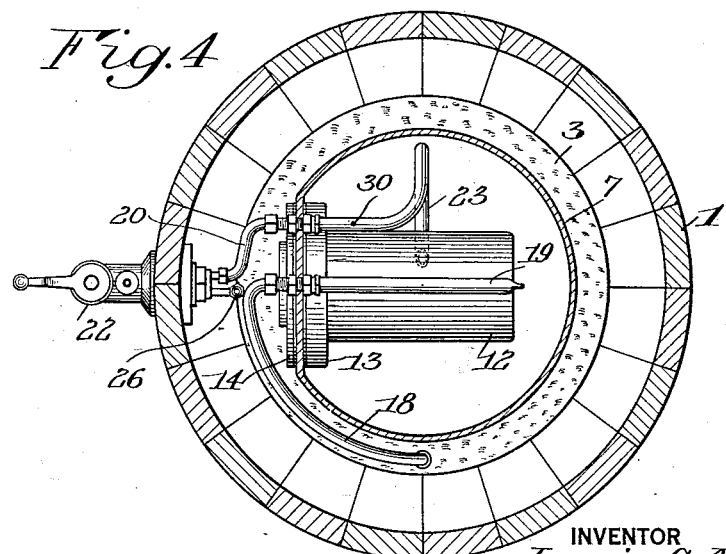

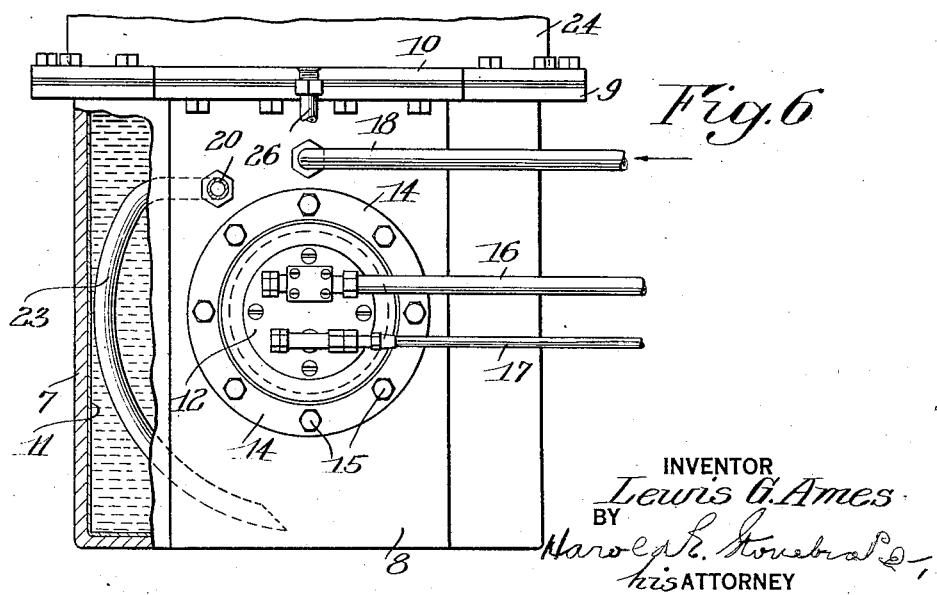

Patented May 10, 1932

1,858,029

UNITED STATES PATENT OFFICE

LEWIS G. AMES, OF ROCHESTER, NEW YORK, ASSIGNOR TO RICHARDSON CORPORATION, OF ROCHESTER, NEW YORK, A CORPORATION OF NEW YORK

BEVERAGE DISPENSER

Application filed March 21, 1930. Serial No. 437,834.

This invention relates to improvements in beverage dispensers, especially to that class of beverage dispensers in which the beverage is drawn from a display tank or barrel.
The object of the invention is to provide a beverage dispenser of this kind which is simple in construction, inexpensive to make, and neat and attractive in appearance.

Another object of the invention is to provide a beverage dispenser of this kind in which the refrigerating element is immersed directly in the liquid container, and in which the liquid is dispensed from the coolest part of the container.
A still further object of the invention is to provide a beverage dispenser of this kind in which the refrigerating element is arranged in the container in such a manner that the liquid entering the container flows over the refrigerating element.

To these and other ends, the invention consists in the construction and arrangement of parts that will appear from the following description when read in conjunction with the accompanying drawings, the novel features being pointed out in the claim following the specification.

In the drawings:

Fig. 1 is a side elevation of a beverage dispenser constructed according to one embodiment of the invention;

Fig. 2 is a plan view of the same, the cover being removed and the upper portion of the casing being sectioned away;
Fig. 3 is an enlarged side elevation, a portion of the casing being sectioned away to expose the interior;

Fig. 4 is a transverse horizontal section of the same through the liquid container, and showing the arrangement of parts therein;

Fig. 5 is an enlarged transverse vertical section of the same, and

Fig. 6 is an enlarged fragmentary front elevation of the liquid container.
Referring specifically to the drawings, in which like reference numerals refer to the same parts in all the figures, 1 is an outer casing shown in the form of a barrel for display purposes, but may be of any other suitable or preferred form. The casing 1 is shown mounted on a suitable support 2. The casing 1 comprises a bottom wall 3 of circular form, from the edge of which rises the outer wall 4 which is open at its upper end. A cover or closure 5 closes the opening at the upper end of the outer wall and is supported directly thereon. An insulating pad 6 is secured to the cover and arranged in the opening in the top of the casing. Arranged in the casing and supported on the bottom 3 thereof is a liquid container 7. The container 7 is preferably constructed of metal in a single piece, open at the top and having a circular opening at its front. The container 7 is substantially cylindrical in form except that it has a plane wall 8 at its front in which said opening is formed.

Around the opening at its top, the container is provided with an outwardly projecting flange 9 which is perforated for the reception of bolts whereby a closure 10 is secured thereto. The closure is clamped tightly in position and may be sealed by means of a gasket, not shown, as usual in the art. The container is preferably provided with a lining 11 of material which is not readily affected by the action of liquids contained therein.

Mounted in the circular opening in the front wall of the container is a refrigerating element or boiler 12 which may be of a well known type usual in the art, and is arranged to project horizontally inwardly from the front wall of the container in which it is secured. Secured to or preferably formed integral with the outer wall of the refrigerating element is a ring or flange 13 arranged to engage the inner surface of the wall 8 when the end of the refrigerating element is inserted in its opening. As shown, a gasket may be inserted between the ring and the wall of the container. On the outside of the wall 8 is a ring 14 arranged on the end of the refrigerating element and over a suitable gasket, as shown. The ring 14 and the wall 8 of the container are provided with a plurality of registering openings for the reception of bolts 15, which, at their inner ends, are threaded into tapped openings in the ring 13. By this arrangement, the ring 13 may be clamped into firm engagement with the wall 8. Connected with and communicating with the interior of the refrigerating element are the conductors 16 and 17 which lead to and from a source of refrigerating medium, such as brine or compressed gas.

Another conductor or pipe 18 is suitably secured in the wall 8 of the container 7, and has a perforated inwardly projecting portion 19 arranged over and above the refrigerating element 12. The outer branch of the conductor 18 extends laterally, rearwardly and downwardly through the bottom of the casing and the support 2, substantially in the direction of the conductors 16 and 17 to a suitable source of carbonated water or other liquid under pressure. By this arrangement, the carbonated liquid under pressure flows through the conductor 18 into the perforated portion 19 from which it flows into the container, from which it is dispensed. By this construction, the liquid in the container 7 is maintained at a substantially uniform pressure, which is controlled by the pressure at its source. When liquid is withdrawn from the container, the pressure within is reduced, causing more liquid to flow in to replace the quantity withdrawn, or reestablish equilibrium.

It will be noted that the refrigerating element is completely immersed in the liquid, and since the liquid in contact therewith is cooled, it has a tendency to fall toward the bottom of the container which is therefore the coolest part thereof. The warmer liquid entering from the conductor 18 enters this falling current and immediately moves into contact with the surface of the refrigerating element. Since the coldest liquid in the container 7 is at the bottom, means are provided for withdrawing it from a point adjacent the bottom of the container. To this end, an outlet pipe 20 is suitably secured in its front wall, and in the embodiment illustrated extends downwardly and forwardly and is connected at its front end to a faucet member 21 arranged in the outer wall of the casing, and at the outer side of the casing is provided with a suitable faucet 22.

The inner branch 23 of the conductor 20 curves laterally downwardly and inwardly around the refrigerating element, and terminates in an open end adjacent the bottom of the container, as clearly shown in Figs. 5 and 6 of the drawings. When the faucet is opened, the liquid flows therefrom under the pressure in the container 7. Since the liquid is carbonated, some of its gas held in suspension may be given up under the reduced pressure in the container, causing the level of the liquid in the container to fall. To overcome this difficulty and maintain the liquid at substantially the same level, the pipe 23 in the container may be provided with an opening, such as the pinhole 30 in its highest branch, through which any gas could escape through the conductor 20 and faucet to the open air when the liquid is being withdrawn.

Means are provided for mixing flavoring syrup, such as fruit juice, with the liquid from the container as it is withdrawn therefrom. To this end, a syrup reservoir or container 24 is mounted on the container 7 and projects forwardly at 25 over the front wall 8 of the container, as shown in Fig. 3. Suitably secured in the bottom of the syrup reservoir and extending vertically downwardly from the forwardly projecting part 25 is a pipe or conductor 26, which, at its lower end, is connected with the inner end of the faucet member 21, see Fig. 4. By this arrangement, syrup from the reservoir 24 flows by gravity to the faucet member, where it may be withdrawn and mixed with the carbonated liquid in a manner well known in the art. By supporting the syrup reservoir in direct contact with the liquid container in which the refrigerating element is arranged, it is maintained at a lower temperature than is otherwise the case; moreover, the syrup is withdrawn from the bottom of the reservoir where its temperature ordinarily is lowest. The space between the outer walls of the reservoir and container and the inner wall of the outside casing may be filled with suitable insulating material in a manner well known in the art.

Although the invention has been described with reference to a single embodiment thereof, it will be understood that this application is intended to cover such changes or modifications thereof as come within the spirit of the invention or scope of the following claim.

I claim:

A beverage dispenser comprising a liquid container, means for supplying liquid to said container under pressure, means for withdrawing liquid from said container, said means comprising a conductor having an open end near the bottom of the container and rising therefrom to a point adjacent its top, and means in said conductor at its point of highest elevation for permitting the escape of gas from the container.

In witness whereof, I have hereunto signed my name.

LEWIS G. AMES.